US012683634B2

(12) United States Patent
Chen et al.

(10) Patent No.: US 12,683,634 B2
(45) Date of Patent: Jul. 14, 2026

(54) MILLIMETER WAVE SIGNAL TRANSMISSION INTEGRATION DEVICE

(71) Applicant: GETAC TECHNOLOGY CORPORATION, New Taipei City (TW)

(72) Inventors: Kuan-Yu Chen, Taipei City (TW); Min-Yu Wang, Taipei City (TW)

(73) Assignee: GETAC TECHNOLOGY CORPORATION, New Taipei City (TW)

( * ) Notice: Subject to any disclaimer, the term of this patent is extended or adjusted under 35 U.S.C. 154(b) by 339 days.

(21) Appl. No.: 18/115,655

(22) Filed: Feb. 28, 2023

(65) Prior Publication Data

US 2024/0137049 A1 Apr. 25, 2024

Related U.S. Application Data

(60) Provisional application No. 63/418,407, filed on Oct. 21, 2022, provisional application No. 63/417,992, filed on Oct. 20, 2022.

(51) Int. Cl.
*H04B 1/04* (2006.01)
*H01Q 1/22* (2006.01)
*H01Q 1/52* (2006.01)

(52) U.S. Cl.
CPC ....... *H04B 1/04* (2013.01); *H04B 2001/0491* (2013.01)

(58) Field of Classification Search
None
See application file for complete search history.

(56) References Cited

U.S. PATENT DOCUMENTS

| | | | |
|---|---|---|---|
| 1,837,775 A * | 12/1931 | Howard | A47C 31/02 |
| | | | D2/977 |
| 10,637,590 B2 | 4/2020 | El-Hassan | |
| 10,998,616 B2 | 5/2021 | Mow et al. | |
| 11,557,842 B2 * | 1/2023 | Cho | H01Q 15/0033 |

(Continued)

FOREIGN PATENT DOCUMENTS

| | | |
|---|---|---|
| CN | 110661562 A | 1/2020 |
| CN | 111758184 A | 10/2020 |

(Continued)

*Primary Examiner* — Pablo N Tran
(74) *Attorney, Agent, or Firm* — Andy M. Han; Han IP PLLC

(57) ABSTRACT

A millimeter wave signal transmission integration device includes an antenna array module, a flexible substrate, a coaxial cable and a signal processing module. The antenna array module is used to transmit and receive millimeter wave signals, and convert millimeter wave signals to intermediate frequency (IF) signals or convert IF signals to millimeter wave signals. The flexible substrate is connected to the antenna array module, and is used to transmit/receive IF signals. The coaxial cable is connected to the flexible substrate and is used to transmit and receive IF signals. The signal processing module is connected to the coaxial cable and is used to transmit and receive IF signals. With the above configuration, the present invention achieves the effects of reduced occupied space of the millimeter wave signal transmission module and reduced attenuation of IF signals.

5 Claims, 2 Drawing Sheets

111

(56) References Cited

U.S. PATENT DOCUMENTS

| | | | | |
|---|---|---|---|---|
| 11,581,635 | B2* | 2/2023 | Sudo | H01Q 25/001 |
| 11,594,824 | B2* | 2/2023 | Zegarra | H01Q 1/2283 |
| 11,600,897 | B2* | 3/2023 | Moon | H01Q 1/02 |
| 11,605,883 | B2* | 3/2023 | Kim | H01Q 1/243 |
| 11,605,904 | B2* | 3/2023 | Yu | H01Q 25/00 |
| 11,616,288 | B2* | 3/2023 | Kim | H01Q 1/38 |
| | | | | 343/702 |
| 11,696,390 | B2* | 7/2023 | Han | H05K 1/0219 |
| | | | | 343/893 |
| 11,749,879 | B2* | 9/2023 | Son | H01Q 5/307 |
| | | | | 343/702 |
| 11,888,212 | B2* | 1/2024 | Kang | H01Q 1/38 |
| 12,068,525 | B2* | 8/2024 | Dalmia | H01Q 1/2283 |
| 12,132,249 | B2* | 10/2024 | Yu | H01L 23/4985 |
| 12,525,704 | B2* | 1/2026 | Xing | H01Q 1/243 |
| 2010/0097286 | A1* | 4/2010 | Morrow | H01Q 1/42 |
| | | | | 343/810 |
| 2012/0235881 | A1 | 9/2012 | Pan et al. | |
| 2012/0309331 | A1 | 12/2012 | Yehezkely et al. | |
| 2019/0103653 | A1 | 4/2019 | Jeong et al. | |
| 2020/0091581 | A1 | 3/2020 | Ou et al. | |
| 2021/0044001 | A1 | 2/2021 | Kang et al. | |
| 2021/0126341 | A1 | 4/2021 | Mizunuma | |

FOREIGN PATENT DOCUMENTS

| | | | |
|---|---|---|---|
| CN | 112366460 | A | 2/2021 |
| CN | 214544288 | U | 10/2021 |
| CN | 114465669 | A | 5/2022 |
| KR | 20210018052 | A | 2/2021 |
| TW | I523315 | B | 2/2016 |
| TW | M547200 | U | 8/2017 |
| TW | 201824638 | A | 7/2018 |
| TW | 201939707 | A | 10/2019 |

* cited by examiner

MILLIMETER WAVE SIGNAL TRANSMISSION INTEGRATION DEVICE

The application claims priority to both U.S. Provisional Application No. 63/418,407 filed Oct. 21, 2022, and also U.S. Provisional Application No. 63/417,992 filed Oct. 20, 2022, the disclosure of which are hereby incorporated by reference herein in their entireties.

BACKGROUND OF THE INVENTION

Field of the Invention

The present invention relates to signal transmission integration devices and, more particularly, to a millimeter wave signal transmission integration device.

Description of the Prior Art

Various manufacturers have developed techniques for wireless wide area network (WWAN) 5G new radio (NR) frequency range 2 (FR2). The operating frequency of FR2 falls within a high range and belongs to a millimeter wave (mmWave) frequency band, in which the energy loss of signals along transmission paths is quite severe, hence causing restricted transmission distances of the signals. Therefore, millimeter wave signals are first down-converted to an intermediate frequency (IF) and then transmitted in order to increase the transmission distances. However, common transmission means between an antenna array and a signal processing circuit include 1) connection via an FR4 printed circuit board (PCB) and a coaxial cable, and 2) connection via a flexible substrate, a motherboard and a coaxial cable. In the first means, although the coaxial cable yields a small loss and a long transmission distance for the signals, the spaces occupied by the antenna array and the FR4 PCB are larger; in the second means, although the spaces occupied by the antenna array and the flexible substrate are smaller, the flexible substrate yields a larger loss for the signals.

SUMMARY OF THE INVENTION

The present invention provides a millimeter wave signal transmission integration device that reduces intermediate frequency (IF) signal attenuation and reduces the space occupied by a millimeter wave signal transmission module.

A millimeter wave signal transmission integration device provided by the present invention includes an antenna array module, a flexible substrate, a coaxial cable and a signal processing module. The antenna array module is used to transmit and receive millimeter wave signals, and convert millimeter wave signals to intermediate frequency (IF) signals or convert IF signals to millimeter wave signals. The flexible substrate is connected to the antenna array module, and is used to transmit/receive IF signals. The coaxial cable is connected to the flexible substrate and is used to transmit and receive IF signals. The signal processing module is connected to the coaxial cable and is used to transmit and receive IF signals.

In one embodiment of the present invention, the flexible substrate is connected to the antenna array module via a first connection interface.

In one embodiment of the present invention, the coaxial cable is connected to the flexible substrate via a second connection interface, and is connected to the signal processing module via a third connection interface.

In one embodiment of the present invention, an operating frequency of the millimeter wave signals ranges between 24.25 GHz and 52.6 GHz.

In one embodiment of the present invention, the antenna array module includes a frequency up-converting/down-converting module, which is used to down-convert millimeter wave signals to IF signals and up-convert IF signals to millimeter wave signals.

In one embodiment of the present invention, the flexible substrate is a liquid crystal polymer (LCP) substrate.

In one embodiment of the present invention, an operating frequency of the IF signals is 10 GHz.

In one embodiment of the present invention, the millimeter wave signal transmission integration device further includes a metal plate. The metal plate is attached to one surface of the flexible substrate, wherein the one surface of the metal plate faces the other surface of the flexible substrate connected to the antenna array module.

In one embodiment of the present invention, the metal plate and the flexible substrate are jointly grounded.

Since only the flexible substrate, the coaxial cable and a plurality of connection interfaces are used, the present invention achieves effects of reduced occupied space of the millimeter wave signal transmission module and reduced attenuation of IF signals.

To better understand the above and other objectives, features and advantages of the present invention, preferred embodiments are described in detail with the accompanying drawings below.

DETAILED DESCRIPTION OF THE EMBODIMENTS

Figure 1:
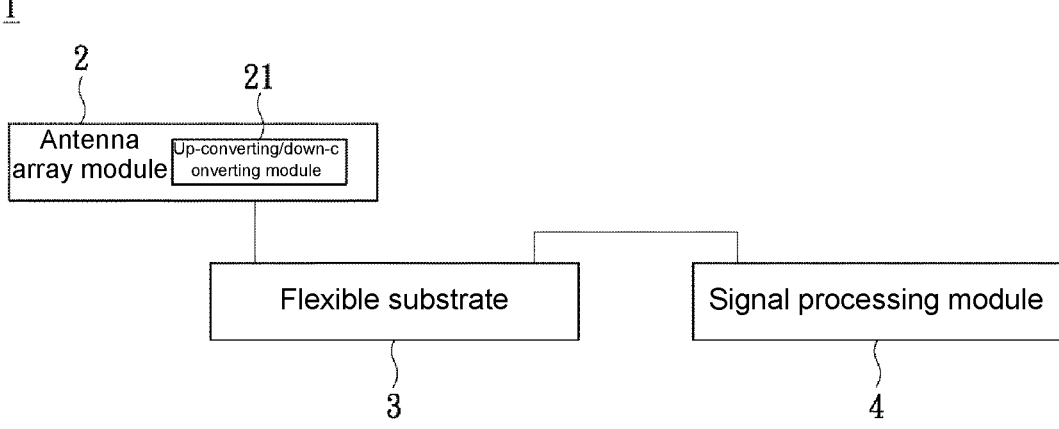
FIG. 1 is a schematic diagram of a millimeter wave signal transmission integration device provided according to a first embodiment of the present invention.

FIG. 1 shows a schematic diagram of a millimeter wave signal transmission integration device provided according to a first embodiment of the present invention. Referring to FIG. 1, the first embodiment of the present invention is applied to a portable device such as a smartphone, a tablet computer and a laptop computer, and is a millimeter wave signal transmission integration device 1 applicable to a limited space and capable of avoiding loss of wireless signals. The millimeter wave signal transmission integration device 1 provided by the present invention includes an antenna array module 2, a flexible substrate 3 and a signal processing module 4. The flexible substrate 3 is connected to the antenna array module 2 and is used to transmit and receive intermediate frequency (IF) signals. The signal processing module 4 is connected to the flexible substrate 3 and is used to transmit and receive IF signals. The antenna array module 2 is used to transmit and receive millimeter wave signals, and convert millimeter wave signals to IF signals or convert IF signals to millimeter wave signals. More specifically, the antenna array module 2 includes a frequency up-converting/down-converting module 21, which is used to down-convert millimeter wave signals to IF signals and up-convert IF signals to millimeter wave signals. The operating frequency of millimeter wave signals ranges, for example but not limited to, between 24.25 GHz and 52.6 GHz, and the operating frequency of IF signals is, for example but not limited to, 10 GHz. Moreover, the flexible substrate 3 is, for example but not limited to, a liquid crystal polymer (LCP) substrate.

Figure 2:
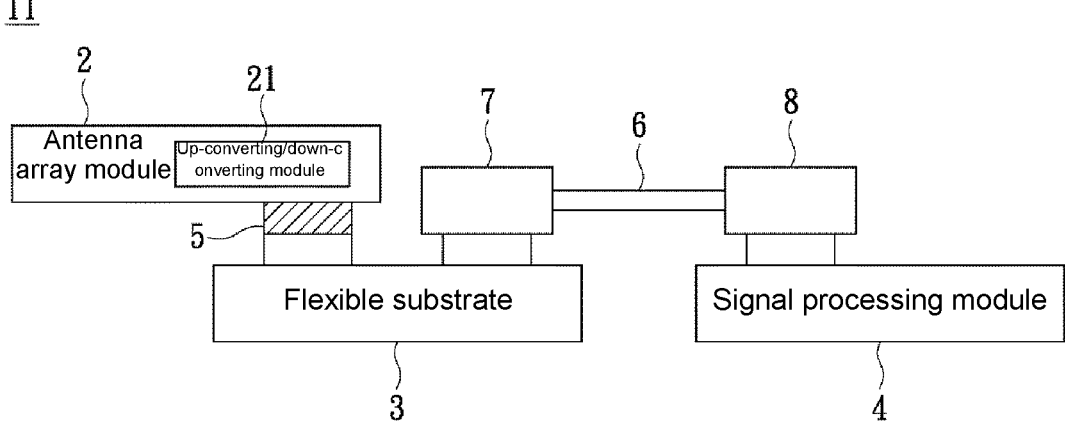
FIG. 2 is a schematic diagram of a millimeter wave signal transmission integration device provided according to a second embodiment of the present invention.

FIG. 2 shows a schematic diagram of a millimeter wave signal transmission integration device provided according to a second embodiment of the present invention. Referring to FIG. 2, the second embodiment of the present invention is applied to a portable device such as a smartphone, a tablet computer and a laptop computer, and is a millimeter wave signal transmission integration device 11 applicable to a limited space and capable of avoiding loss of wireless signals. The millimeter wave signal transmission integration device 11 provided by the present invention includes an antenna array module 2, a first connection interface 5, a flexible substrate 3, a second connection interface 7, a coaxial cable 6, a third connection interface 8 and a signal processing module 4. The flexible substrate 3 is connected to the antenna array module 2 via the first connection interface 5 and is used to transmit and receive IF signals. The signal processing module 4 is connected to the flexible substrate 3 via the coaxial cable 6 and is used to transmit and receive IF signals. More specifically, the coaxial cable 6 is connected to the flexible substrate 3 via the second connection interface 7, and is connected to the signal processing module 4 via the third connection interface 8. Moreover, the antenna array module 2 is used to transmit and receive millimeter wave signals, and convert millimeter wave signals to IF signals or convert IF signals to millimeter wave signals. More specifically, the antenna array module 2 includes a frequency up-converting/down-converting module 21, which is used to down-convert millimeter wave signals to IF signals and up-convert IF signals to millimeter wave signals. The operating frequency of millimeter wave signals ranges, for example but not limited to, between 24.25 GHz and 52.6 GHz, and the operating frequency of IF signals is, for example but not limited to, 10 GHz. The flexible substrate 3 is, for example but not limited to, a liquid crystal polymer (LCP) substrate. It should be noted that, the first connection interface 5, the second connection interface 7 and the third connection interface 8 are, for example but not limited to, I-PEX connectors.

Figure 3:
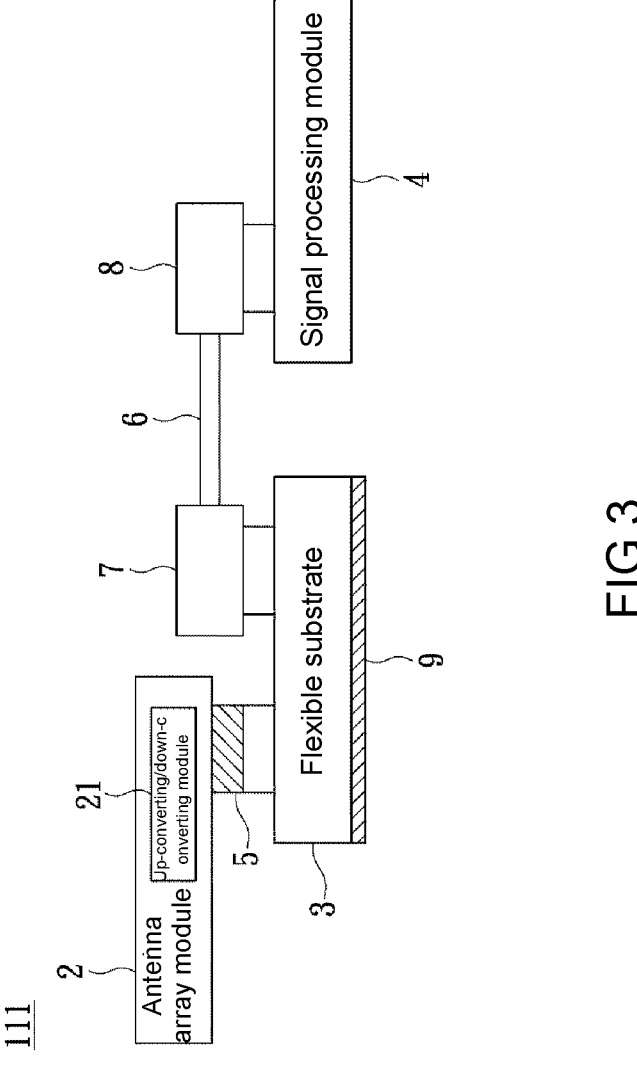
FIG. 3 is a schematic diagram of a millimeter wave signal transmission integration device provided according to a third embodiment of the present invention.

FIG. 3 shows a schematic diagram of a millimeter wave signal transmission integration device provided according to a third embodiment of the present invention. Referring to FIG. 3, the third embodiment of the present invention is applied to a portable device such as a smartphone, a tablet computer and a laptop computer, and is a millimeter wave signal transmission integration device 111 applicable to a limited space and capable of avoiding loss of wireless signals. The millimeter wave signal transmission integration device 111 provided by the present invention includes an antenna array module 2, a first connection interface 5, a flexible substrate 3, a second connection interface 7, a coaxial cable 6, a third connection interface 8, a signal processing module 4 and a metal plate 9. The flexible substrate 3 is connected to the antenna array module 2 via the first connection interface 5 and is used to transmit and receive IF signals. The signal processing module 4 is connected to the flexible substrate 3 via the coaxial cable 6 and is used to transmit and receive IF signals. More specifically, the coaxial cable 6 is connected to the flexible substrate 3 via the second connection interface 7, and is connected to the signal processing module 4 via the third connection interface

8. Moreover, the antenna array module 2 is used to transmit and receive millimeter wave signals, and convert millimeter wave signals to IF signals or convert IF signals to millimeter wave signals. More specifically, the antenna array module 2 includes a frequency up-converting/down-converting module 21, which is used to down-convert millimeter wave signals to IF signals and up-convert IF signals to millimeter wave signals. In addition, the metal plate 9 is attached to one surface of the flexible substrate 3, and this surface is opposite to the other surface of the flexible substrate 3 connected to the antenna array module 2, wherein this surface and the flexible substrate 3 are jointly grounded. The operating frequency of millimeter wave signals ranges, for example but not limited to, between 24.25 GHz and 52.6 GHz, and the operating frequency of IF signals is, for example but not limited to, 10 GHz. The flexible substrate 3 is, for example but not limited to, a liquid crystal polymer (LCP) substrate. It should be noted that, the first connection interface 5, the second connection interface 7 and the third connection interface 8 are, for example but not limited to, I-PEX connectors.

In conclusion, since only the flexible substrate, the coaxial cable and a plurality of connection interfaces are used, the millimeter wave signal transmission integration device of the present invention achieves effects of reduced occupied space of the millimeter wave signal transmission module and reduced attenuation of IF signals.

The present invention is disclosed as the embodiments above. However, these embodiments are not to be construed as limitations to the present invention. Slight modifications and variations may be made to the embodiments by a person skilled in the art without departing from the spirit and scope of the present invention. Therefore, the scope of legal protection for the present invention shall be defined by the appended claims.

What is claimed is:

1. A millimeter wave signal transmission integration device, comprising:

an antenna array module, used to transmit and receive a millimeter wave signal, and convert the millimeter wave signal to an intermediate frequency (IF) signal or convert the IF signal to the millimeter wave signal, wherein the antenna array module comprises a frequency up-converting/down-converting module, which is used to down-convert the millimeter wave signal to the IF signal and up-convert the IF signal to the millimeter wave signal;

a flexible substrate, separated from the antenna array module and connected to the antenna array module via a first connection interface which is an I-PEX connector, and used to transmit/receive the IF signal;

a coaxial cable, connected to the flexible substrate, and used to transmit and receive the IF signal via a second connection interface;

a signal processing module, connected to the coaxial cable via a third connection interface, and used to transmit and receive the IF signal; and a metal plate, attached to one surface of the flexible substrate, wherein the one surface of the flexible substrate is opposite to one other surface of the flexible substrate connected to the antenna array module, wherein the second connection interface and the third connection interface are I-PEX connectors.

2. The millimeter wave signal transmission integration device according to claim 1, wherein an operating frequency of the millimeter wave signal ranges between 24.25 GHz and 52.6 GHz.

3. The millimeter wave signal transmission integration device according to claim 1, wherein the flexible substrate is a liquid crystal polymer (LCP) substrate.

4. The millimeter wave signal transmission integration device according to claim 1, wherein an operating frequency of the IF signal is 10 GHz.

5. The millimeter wave signal transmission integration device according to claim 1, wherein the metal plate and the flexible substrate are jointly grounded.

* * * * *